Figure 1:
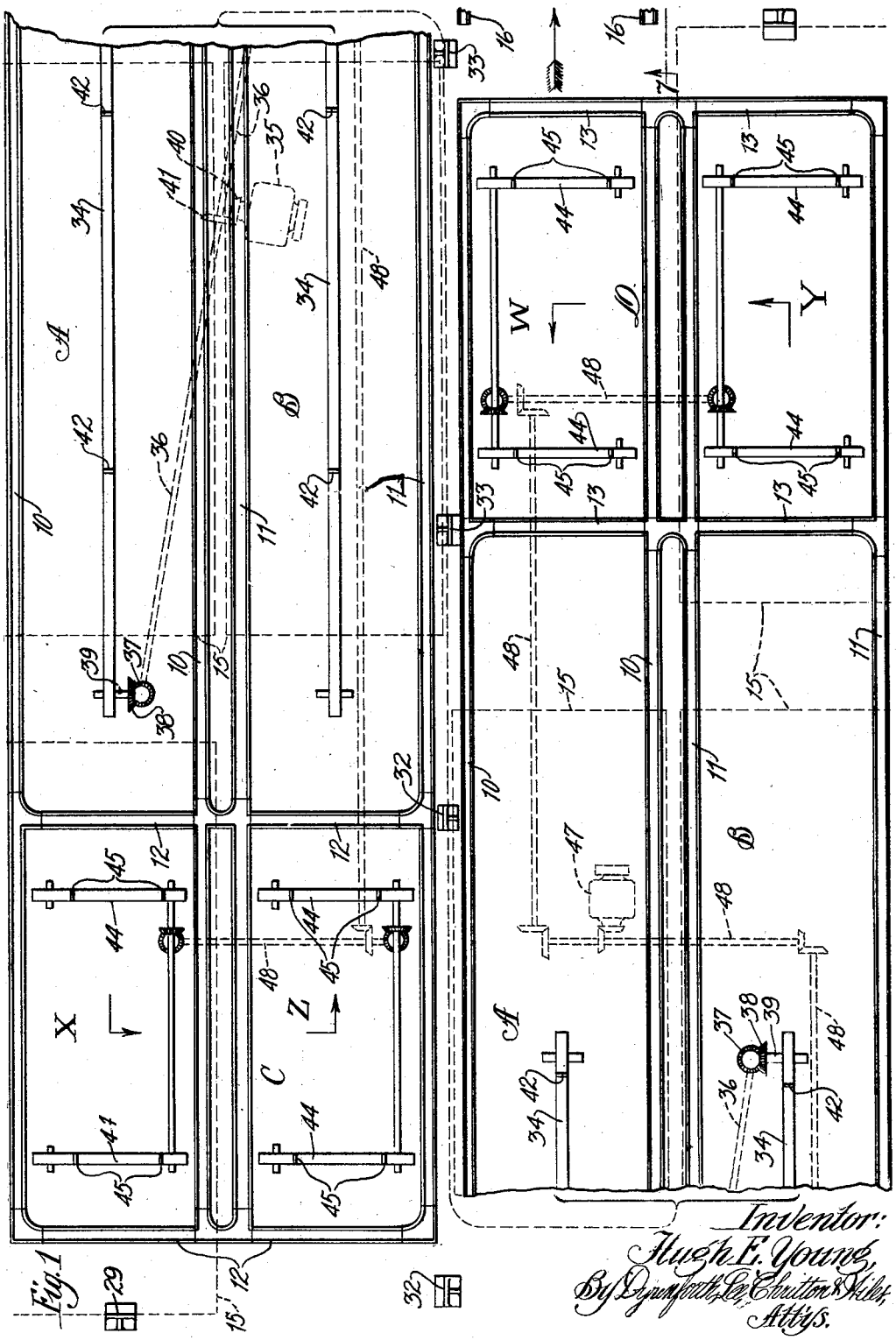

Sept. 16, 1930. H. E. YOUNG 1,775,799
STORAGE SYSTEM
Filed Jan. 18, 1928 3 Sheets-Sheet 1

Inventor:
Hugh E. Young
By Dynforth, Lee, Chritton & Wiles
Attys.

Sept. 16, 1930.  H. E. YOUNG  1,775,799
STORAGE SYSTEM
Filed Jan. 18, 1928   3 Sheets-Sheet 2
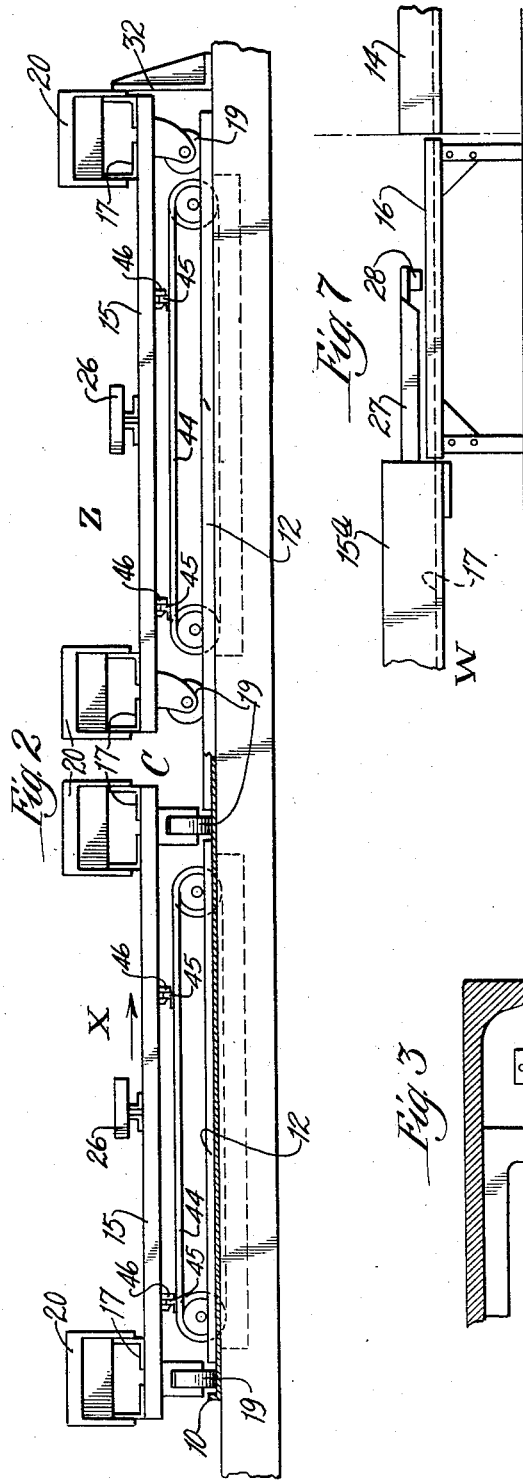
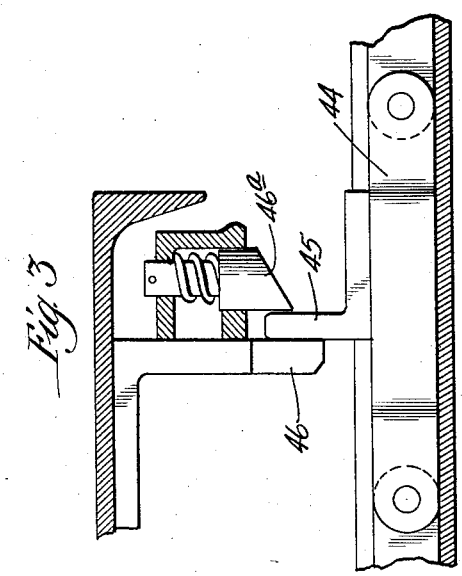
Inventor:
Hugh E. Young,

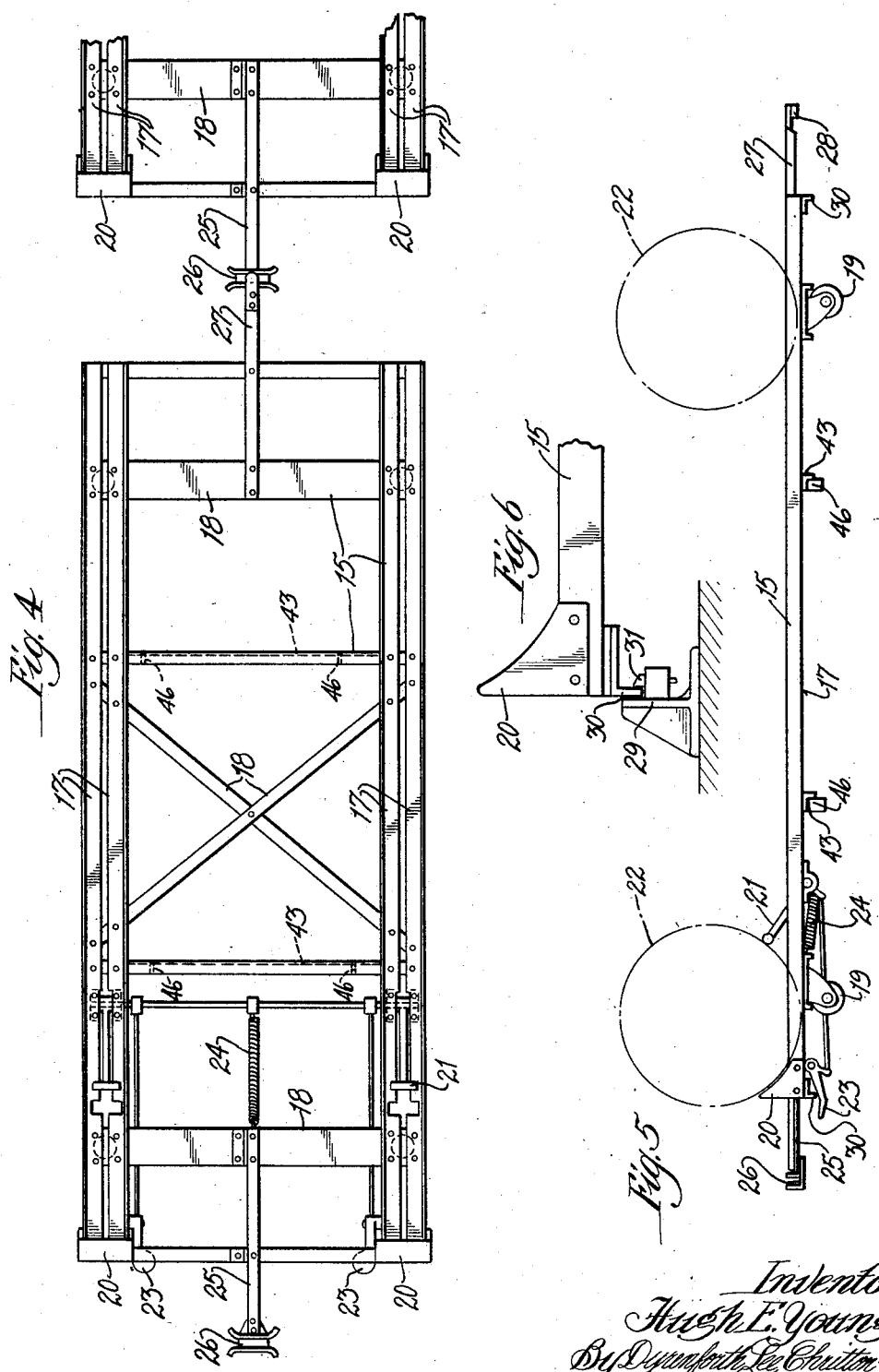

Patented Sept. 16, 1930

1,775,799

UNITED STATES PATENT OFFICE

HUGH E. YOUNG, OF CHICAGO, ILLINOIS, ASSIGNOR OF ONE-HALF TO EUGENE S. TAYLOR

STORAGE SYSTEM

Application filed January 18, 1928. Serial No. 247,598.

This invention relates to improvements in garages, and more specially to a storage garage adapted for storing or housing vehicles, such as, for example, motor vehicles.

By the use of my invention, there is great economy in space provided in the storing of motor vehicles and individual vehicles may readily be placed in storage and removed therefrom with little or no disturbance to the remaining vehicles and with practically no danger of injury by collision. The invention is especially valuable for use in larger cities, and metropolitan districts where storage space for motor vehicles is at a premium and where the placing of vehicles in storage and their removal therefrom with ease and facility is especially desirable.

For the purpose of illustration, I have shown a single floor or story embodying my invention; but it is to be understood that a plurality of floors or stories may be constructed in a garage or building of any height, without detracting from the spirit of my invention. In the event, the invention is embodied in more than one story, vehicles may be raised to and lowered from the upper stories by means of elevators, ramps, or any other similar device now in common use.

Other features and advantages of my invention will appear more fully as I proceed with my application.

In that form of device embodying the features of my invention shown in the accompanying drawings, Figure 1 is a diagrammatical, fragmentary plan view of a single floor or story of a storage garage embodying the features of my invention; Fig. 2 is a view in end elevation; Fig. 3 is a vertical sectional view of the latch for the cross-conveyor; Fig. 4 is a top plan view of one of the carriers; Fig. 5 is a similar view in side elevation; Fig. 6 is a view of one of the stops, and Fig. 7 is a view indicated by the line 7 of Fig. 1.

In general, it may be stated that I provide for each unit of storage space a closed rectangular circuit substantially filled with vehicle carriers, such circuit having its long sides parallel and adjacent. The vehicle carriers are adapted to move around said circuit, and at one or more points adjacent said circuit, means are provided for loading or unloading the carriers. For example, the carriers of the circuit may be loaded or unloaded from an elevator, which elevator may serve several floors in a building, each floor being provided with similar circuits. Since the sides are adjacent, it is obvious that if the same is entirely filled with carriers that they could not move around the circuit. Consequently, I leave preferably one vacant space at a corner equivalent to the space occupied by one carrier. The carriers may then be moved around the circuit by advancing these on one boundary of the circuit to fill the vacant space at the corner and leave another vacant space at another corner, and repeating seriatim. If desired, two vacant spaces may be left at diagonally opposite corners, and in such case the carriers on opposite boundaries of the circuit are moved simultaneously to fill such two vacant corners and leave the other two diagonally opposite corners vacant. This process is then repeated seriatim.

In order to move the carriers around the circuit, I provide means for linking them into trains. The connection between the carriers, however, permits the end carriers to be disengaged for the transverse movement.

As shown in the drawings, Fig. 1 is a plan view of a unit of storage space occupied by a rectangular circuit as referred to. Such circuit comprises the longitudinal tracks A and B and the transverse tracks C and D. The track A is here shown as formed by the rails 10 and the track B by the rails 11. It will be seen that the tracks A and B are adjacent each other; that is, the carriers on these two tracks pass very closely to each other. The transverse track C consists of the rails 12, 12, and the transverse track D is formed of rails 13, 13. As here shown, the rails 10, 11, 12 and 13 are preferably channel-irons with the flanges turned upwardly, and the carriers are provided with casters adapted to travel therein. Other suitable rails and wheels, rollers or the like could be utilized.

At one point in the circuit, for example, where indicated by the arrow in Fig. 1, means are provided for loading and unloading the carriers. For example, as shown in Fig. 7, the vehicles to be stored can be raised by the elevator 14 and moved onto one of the carriers as indicated by 15$^a$ over suitable bridge members indicated by 16.

The carriers referred to, indicated in general by 15 or 15$^a$, may be as shown in Figs. 2, 4 and 5. As here shown, the carrier is made up of suitable longitudinal angle irons 17 held together by cross-braces 18 to form a substantially rigid rectangular truck, carriage or carrier adapted to support a vehicle to be stored. The carrier is preferably mounted on caster wheels 19 adapted to travel on the rails 10, 11, 12 and 13. The longitudinal angle irons 17 are preferably arranged in pairs on the two sides of the carrier to provide rails similar to channel-irons in which the wheels of the vehicle to be stored may run, thus assisting in quickly placing the vehicle on the carrier. Suitable means may also be provided for preventing endwise movement of a vehicle on the carrier after it has been but in place. Such means, for example, may consist of the end-stops 20 and the spring stops 21 adapted to be depressed by a vehicle wheel 22 in passing over, and designed to spring up again after the wheel has passed to prevent backward movement of the vehicle on the carrier. An ordinary foot treadle 23 may be provided to depress the stop 21, when desired, against the resistance of the spring 24.

Each of the carriers 15 is provided with a front draw-bar 25 provided with a transverse slot 26, and a rear draw-bar 27 provided with a depending pin 28. The pin 28 on a rear draw-bar is adapted to engage in the slot 26 in a front-draw bar, as shown in Fig. 4, to link the carriers in trains. It will be seen, however, that the transverse slot 26 will permit disengagement of the end carrier from the train for its transverse movement.

Suitable stops are provided to prevent the carriers from moving too far and latch to prevent undesired reverse movement. For example, at the end of track A there may be a stop 29 (see Fig. 6) adapted to be engaged by lugs 30 on the carrier 15. 31 indicates any suitable spring latch adapted to engage the rear side of the lug 30 to prevent undesired reverse movement of the carrier 15. It will be seen, however, that by the arrangement of stop and latch, as shown in Fig. 6, transverse movement of the carrier is not prevented as the lug 30 is free to move out side-ways from between the stop 29 and the latch 31. Similar stops 32, 32, 33, 33, may be provided to limit the side-way movement of the carriers.

To effect the longitudinal movement of the carriers, I provide conveyor chains 34, 34, driven by a motor 35 through the diagonal shaft 36, the ends of which are provided with bevel gears 37, 37, meshing with the bevel gears 38 on the shafts 39 which carry the conveyor chains 34. The shaft 36 is adapted to be driven from the motor 35 through the bevel gears 40 and 41. The chain conveyors 34 are provided with a plurality of driving lugs 42 adapted to engage the cross-bars or angle irons 43, 43, under the carriers 15. The transverse movement of the carriers is effected in a similar manner. As here shown, I provide at each end four cross-conveyor chains 44 provided with driving lugs 45 adapted to engage the depending lugs 46, 46, underneath the carriers 15. 46$^a$ indicates a spring latch arranged in conjunction with each lug 46 to prevent overrunning of the carrier. The conveyor chains 44 are adapted to be driven by the motor 47 though the shafting 48, as shown. I provide four transverse conveyor chains at each end because, owing to the length of the carriers, it is desirable to have two points of contact by which they are moved side-ways. Also, it is difficult to arrange the cross-conveyors across the track-ways over which the casters ride. Therefore, I provide two such conveyor chains, each operating entirely within one set of tracks. The lugs on the carriers and the projections on the chains are so designed that before a carrier has become entirely disengaged from the conveyor in one track it has become engaged with the conveyor in the adjacent track.

In operation, the circuit comprised by the tracks A, B, C and D is substantially filled with conveyors 15, with preferably two vacant spaces at diagonally opposite corners. As indicated by X and Y. An automobile to be stored is moved from the elevator 14 across the bridge member 16 onto the carrier 15$^a$ adjacent the elevator. The train of carriers on the track A is then moved forward to fill the vacant corner X and preferably the train on the track B is moved forward to fill the vacant corner Y. This leaves the corners Z and W vacant. The cars at X and Y are then preferably simultaneously moved transversely to fill the corners Z and W, thus placing another carrier in front of the elevator to be loaded. The unloading of the carriers effected in a similar manner. It is obvious, that, if desired, the carriers on opposite sides of the circuit may not be moved simultaneously, but one train at a time. Also, if desired, the apparatus could be designed to move the carriers around the circuit in both directions. Also, if desired, there could be only one vacant corner, and, in such case, in moving the carriers around the circuit, the carriers on one boundary would be advanced to fill the vacant corner, thus leaving another space at another corner, and this operation repeated seriatim.

In the present embodiment of the invention, the circuit for the carriers is arranged in a horizontal plane. It is obvious, however, that the circuit could be arranged in a vertical plane so that trains of carriers on the two long sides of the circuit would move one above the other and the movement at the ends would be vertical.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. Storage apparatus for vehicles including a plurality of vehicle movers arranged in a closed elongated rectangular circuit in a horizontal plane with parallel closely adjacent sides occupying a unit of storage space, said vehicle movers substantially filling said circuit with the exception of a vacant space at a corner; and means for moving the movers around said circuit by moving an end mover transversely from one side of the circuit to the other to fill said vacant space at the corner, and leave another vacant space at another corner, then advancing the line of movers at one side of the circuit to fill said vacant space and leave another vacant space, and repeating seriatim.

2. Storage apparatus for vehicles including a plurality of vehicle movers arranged in a closed elongated rectangular circuit in a horizontal plane with parallel closely adjacent sides occupying a unit of storage space, said vehicle movers substantially filling said circuit with the exception of a vacant space at a corner; means for linking the movers at the sides of the circuit into trains; means permitting disengagement of the end mover from the train to permit transverse movement of said end mover from one side of the circuit to the other; and means for moving the movers around said circuit by moving an end mover transversely from one side of the circuit to the other to fill the vacant space at the corner, and leave another vacant space at another corner, then advancing the train of movers at one side of the circuit to fill said vacant space and leave another vacant space, and repeating seriatim.

3. Storage apparatus for vehicles including a plurality of vehicle movers arranged in a closed elongated rectangular circuit in a horizontal plane with parallel closely adjacent sides occupying a unit of storage space, said vehicle movers substantially filling said circuit with the exception of two vacant spaces at diagonally opposite corners; and means for moving the movers around said circuit by moving end movers transversely from one side of the circuit to the other to fill said vacant spaces at the corners and leave two other vacant spaces at other corners, then advancing the lines of movers at the two sides of said circuit to fill said last-mentioned vacant spaces and leave other vacant spaces, and repeating seriatim.

4. Storage apparatus for vehicles including a plurality of vehicle movers arranged in a closed elongated rectangular circuit in a horizontal plane with parallel closely adjacent sides occupying a unit of storage space, said vehicle movers substantially filling said circuit with the exception of two vacant spaces at diagonally opposite corners, means for linking the movers at the sides of the circuit into trains, means permitting disengagement of the end mover from the train to permit transverse movement of said end mover from one side of the circuit to the other; and means for moving the movers around said circuit by moving the end movers transversely from one side of the circuit to the other to fill said vacant spaces at the corners and leave two other vacant spaces at other corners, then advancing the trains of movers at the two sides of said circuit to fill said last-mentioned vacant spaces and leave other vacant spaces, and repeating seriatim.

In witness whereof, I have hereunto set my hand this 14th day of January, 1928.

HUGH E. YOUNG.